July 5, 1960

G. PIERSCHEL 2,943,534

FILM PROJECTOR DEVICE

Filed June 11, 1957

INVENTOR
GERHARD PIERSCHEL

United States Patent Office 2,943,534
Patented July 5, 1960

2,943,534
FILM PROJECTOR DEVICE

Gerhard Pierschel, Dresden, Germany, assignor to VEB Kamera- und Kinowerke Dresden Filed June 11, 1957, Ser. No. 664,929

Claims priority, application Germany Aug. 18, 1956

1 Claim. (Cl. 88—17)

This invention relates to film projectors, and more particularly to improvements in projector elements and methods associated with film protection.

It is an object of the invention to provide for the protection of film against excessive heat. In projectors, and more particularly projectors of high power consumption, film is subjected to high temperatures which can cause permanent damage. It is this effect which the invention seeks to avoid.

A further object of the invention is to provide an especially efficient film cooling means which is adapted to cool not only the film itself but, further, areas adjacent the film so as to present optimum conditions for film use.

Figure 1:
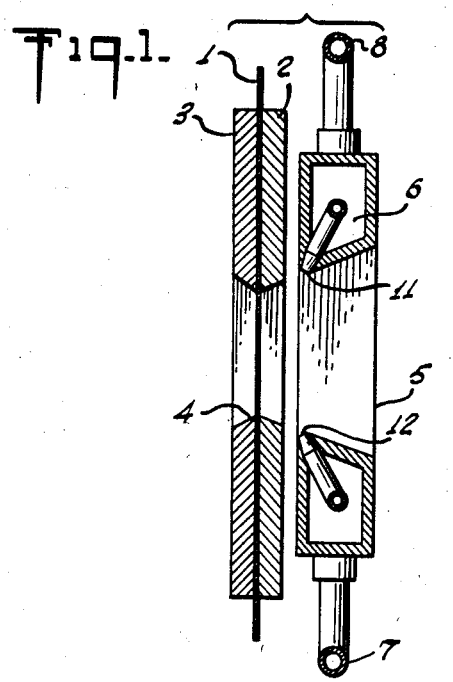
Figure 2:
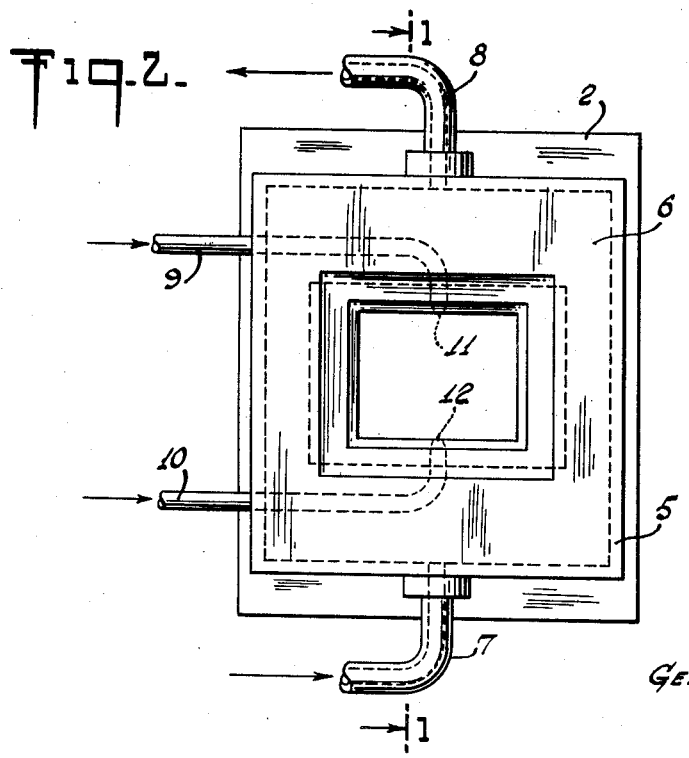

These and other objects of the invention will be apparent in the following description including the appended drawing in which:

Figure 1 is a side sectional view of a projector mechanism provided in accordance with the invention, the view being taken along line I—I of Figure 2; and Figure 2 is a front plan view of the mechanism wherein the hidden elements are shown by dotted lines.

Film in a projector is subjected to the highest temperature in the region where it passes in front of the focussed light beam which is intended to project an image onto a screen or the like. It is in this region that the invention contemplates exercising its cooling function although it will be apparent that, should projector design warrant it, the function can be exercised in different regions within the scope of the invention.

To effect a cooling of the film, the invention provides for directing compressed air thereagainst in the region referred to above. However, compressed air sources generally provide air which is preheated to a certain extent and which consequently impairs the cooling effect of the air. Furthermore, compressed air need necessarily be led to its utilization area by means of conduits or the like and, in many projector designs, these conduits would be subjected to radiated heat which would further preheat the compressed air before it is directed against the film.

In order to counter this undesired preheating of the compressed air, the invention provides for leading the air to its utilization area through a fluid cooling system. The fluid cooling system is so positioned as to obtain an optimum cooling arrangement.

A preferred embodiment of the invention as shown in the drawing processes a film strip 1 led in a predetermined path past a beam of light by means of a film guide consisting of the elements 2 and 3 provided with an aperture 4 by means of which an image is projected onto a screen or the like. The film guide can be of any known type and the projector may be of the motion picture type or a slide projector.

The cooling mechanism can be positioned on either side of the film guide, i.e. preferably intermediate the film guide and the projector proper, or, in the alternative, on the side of the film guide which is away from the projector. In either event, the cooling mechanism defines an aperture 5, so as not to interfere with the passage of the light beam, or is otherwise of a configuration so as not to impair the projecting efficiency of the projector.

The cooling mechanism includes a fluid jacket 6 to which is attached by appropriate means the conduits 7 and 8 for the supply and discharge of a fluid circulating therethrough. The fluid is preferably water, but other types of suitable cooling fluids may also be used.

Extending through the jacket 6 are two compressed air conduits 9 and 10. These conduits terminate in jet nozzles 11 and 12 which direct the air against the film 1 either directly or indirectly.

The fluid jacket is, in the embodiment shown, a planar rectangular jacket which is juxtaposed to the planar film guide. The jacket 6 is provided with a shiny heat-reflecting surface over most of its outer surface, but adjacent the film guide it can be provided with a dark surface, by an enamel or paint or otherwise, so as to absorb a maximum of heat from the film guide.

The conduits 9 and 10 are preferably constructed of copper or a like material of good heat conducting quality so as to effect an optimum heat exchange between the fluid and the air. The path of the conduits 9 and 10 can be varied and extended so as to increase the surface area which the fluid can contact.

According to the method of the invention, the compressed air previously cooled by the fluid is directed toward the film at the aperture 4. The film so cooled will not be subject to damage by heat, and moreover the film guide will be cooled so that, if film is transported between two closely spaced elements, their expansion will be minimized and of no consequence.

There will now be obvious to those skilled in the art many modifications of the structure and method set forth which do not depart from the scope of the invention as defined in the following claim.

What is claimed is:

Cooling system for film-guide means in projectors, which comprises in combination a jacket for cooling water in the shape of a closed tubular loop in juxtaposed position to said film-guide means, said loop defining a light aperture, inlet and outlet conduits for continuous supply and discharge of said cooling water to and from said jacket, respectively, and ducts for compressed air extending through said jacket and having nozzles opening at opposite sides of said aperture for projecting the water-cooled, compressed air at a film to be cooled.

References Cited in the file of this patent

UNITED STATES PATENTS

| | | |
|---|---|---|
| 1,507,360 | Anselmi et al. | Sept. 2, 1924 |
| 1,770,659 | Oehmicken | July 15, 1930 |
| 1,953,713 | Hoffman | Apr. 3, 1934 |
| 2,556,769 | Miller | June 12, 1951 |

FOREIGN PATENTS

| | | |
|---|---|---|
| 29,117 | Great Britain | of 1909 |
| 237,908 | Great Britain | 1927 |
| 416,875 | Great Britain | Sept. 24, 1934 |
| 549,205 | France | Nov. 13, 1922 |